US012186868B2

(12) United States Patent
Komazaki

(10) Patent No.: US 12,186,868 B2
(45) Date of Patent: Jan. 7, 2025

(54) DRIVING DEVICE

(71) Applicant: Koki Holdings Co., Ltd., Tokyo (JP)

(72) Inventor: Yoshiichi Komazaki, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 17/773,496

(22) PCT Filed: Sep. 25, 2020

(86) PCT No.: PCT/JP2020/036449
§ 371 (c)(1),
(2) Date: Apr. 29, 2022

(87) PCT Pub. No.: WO2021/084993
PCT Pub. Date: May 6, 2021

(65) Prior Publication Data
US 2024/0173833 A1 May 30, 2024

(30) Foreign Application Priority Data
Nov. 1, 2019 (JP) ................................ 2019-199473

(51) Int. Cl.
*B25C 1/06* (2006.01)
*B25C 1/04* (2006.01)
*B25C 1/18* (2006.01)

(52) U.S. Cl.
CPC .................. *B25C 1/06* (2013.01); *B25C 1/04* (2013.01); *B25C 1/184* (2013.01)

(58) Field of Classification Search
CPC .............. B25C 1/06; B25C 1/04; B25C 1/184
See application file for complete search history.

(56) References Cited

U.S. PATENT DOCUMENTS 3,066,304 A * 12/1962 Wantland .............. B25B 27/146 72/407
2008/0048000 A1 2/2008 Simonelli et al.
(Continued)

FOREIGN PATENT DOCUMENTS

CN 204036395 U 12/2014
CN 206937241 U 1/2018
(Continued)

OTHER PUBLICATIONS

International Search Report issued in corresponding International Application No. PCT/JP2020/036449, dated Dec. 22, 2020 w/English Translation.

*Primary Examiner* — Nathaniel C Chukwurah
(74) *Attorney, Agent, or Firm* — Rimon P.C.

(57) ABSTRACT

A driving device includes: a cylindrical-shape magazine configured to house fasteners connected in a roll form; an injecting portion configured to receive the fastener fed from the magazine; a striking portion configured to be movable in a first direction in which the fastener fed to the injecting portion is allowed to be struck and movable in a second direction opposite to the first direction; a first bias portion configured to move the striking portion in the first direction; an electrical motor moving the striking portion in the second direction; a housing configured to support the striking portion and the electrical motor; and a handle configured to protrude from the housing in a direction crossing a moving direction of the striking portion. The electrical motor has a rotary shaft, and the rotary shaft extends in a direction crossing a plan orthogonal to the moving direction of the striking portion.

20 Claims, 15 Drawing Sheets

(56) References Cited

U.S. PATENT DOCUMENTS

| | | | | |
|---|---|---|---|---|
| 2011/0303428 | A1 | 12/2011 | Roth et al. | |
| 2011/0303728 | A1 | 12/2011 | Franz et al. | |
| 2016/0207185 | A1* | 7/2016 | Garber | B25C 1/008 |
| 2017/0274513 | A1* | 9/2017 | Pedicini | B25C 1/003 |

FOREIGN PATENT DOCUMENTS

| | | | |
|---|---|---|---|
| JP | S55-024874 | A | 2/1980 |
| JP | 2006-026858 | A | 2/2006 |
| JP | 2006-130617 | A | 5/2006 |
| JP | 2012-000751 | A | 1/2012 |
| JP | 2012-000764 | A | 1/2012 |
| JP | 2016-190277 | A | 11/2016 |
| JP | 2017-119330 | A | 7/2017 |
| JP | 2019-098456 | A | 6/2019 |
| JP | 2019-107713 | A | 7/2019 |

* cited by examiner

DRIVING DEVICE

CROSS REFERENCE TO RELATED APPLICATIONS

This application is the U.S. National Phase under 35 U.S.C. § 371 of International Application No. PCT/JP2020/036449, filed on Sep. 25, 2020, which claims the benefit of Japanese Application No. 2019-199473, filed on Nov. 1, 2019, the entire contents of each of which Applications are hereby incorporated by reference in their entirety.

TECHNICAL FIELD

The present invention relates to a driving device including an injecting portion, a magazine capable of spirally arranging and housing a plurality of fasteners to be fed to the injecting portion, and a striking portion capable of striking the fastener to be fed from the magazine to the injecting portion.

BACKGROUND ART

A driving device including an injecting portion, a magazine capable of spirally arranging and housing a plurality of fasteners to be fed to the injecting portion, and a striking portion capable of striking the fastener to be fed from the magazine to the injecting portion is described in a Patent Document 1. The driving device described in the Patent Document 1 includes a housing that houses a cylinder, a nose portion serving as the injection portion, the striking portion including a handle, the cylinder, the magazine and a rack, a tubular portion, an accumulator, a motor case, an electrical motor, a bevel gear, a cam plate having protrusion and a trigger arranged in the handle.

The handle is consecutively formed to the housing, and the magazine houses nails serving as the fasteners to be fed to the injecting portion. The striking portion is movable in the cylinder. The tubular portion is fixed to the cylinder, and the accumulator is formed inside the tubular portion. The motor case is connected to the housing, and the electrical motor is housed inside the motor case. The bevel gear is rotated by the electrical motor, and the cam plate is rotated by the bevel gear.

In the driving device described in the Patent Document 1, the electrical motor is rotated by operation of the trigger. By a rotary force of the electrical motor, the bevel gear is rotated, and the cam plate is rotated. By engagement of the protrusion of the cam plate with the rack, the striking portion is ascended, and a pressure of the accumulator is increased. By release of the protrusion from the rack, the striking portion is descended because of the pressure of the accumulator, and the striking portion strikes the nail fed from the magazine to the nose portion.

RELATED ART DOCUMENT

Patent Document

Patent Document 1: Japanese Patent Application Laid-Open Publication No. 2016-190277

SUMMARY OF THE INVENTION

Problems to be Solved by the Invention

The present inventors have found a problem that is a possibility of reduction in operability of a driving device including a cylindrical magazine housing fasteners that are wound in a roll form and an electrical motor moving a striking portion.

An object of the present invention is to improve operability of a driving device including a magazine housing fasteners that are connected in a roll form and an electrical motor moving a striking portion.

Means for Solving the Problems

A diving device of one embodiment includes: a cylindrical magazine allowed to house a plurality of connected fasteners in a roll form; an injecting portion receiving the fastener fed from the magazine; a striking portion configured to be movable in a first direction enabling the fastener fed to the injection portion to be struck and movable in a second direction opposite to the first direction; a first bias portion configured to move the striking portion in the first direction; an electrical motor configured to move the striking portion in the second direction; a housing configured to support the striking portion and the electrical motor; and a handle configured to protrude from the housing in a direction crossing a moving direction of the striking portion, the electrical motor has a rotary shaft, and the rotary shaft extends in a direction crossing a plane orthogonal to the moving direction of the striking portion.

Effects of the Invention

According to the driving device of one embodiment, the operability of the driving device including the magazine housing the fasteners that are connected in a roll form and the electrical motor moving the striking portion can be improved.

BRIEF DESCRIPTIONS OF THE DRAWINGS

BEST MODE FOR CARRYING OUT THE INVENTION

Some driving devices according to embodiments of the present invention will be explained with reference to the drawings.

First Embodiment

Figure 1:
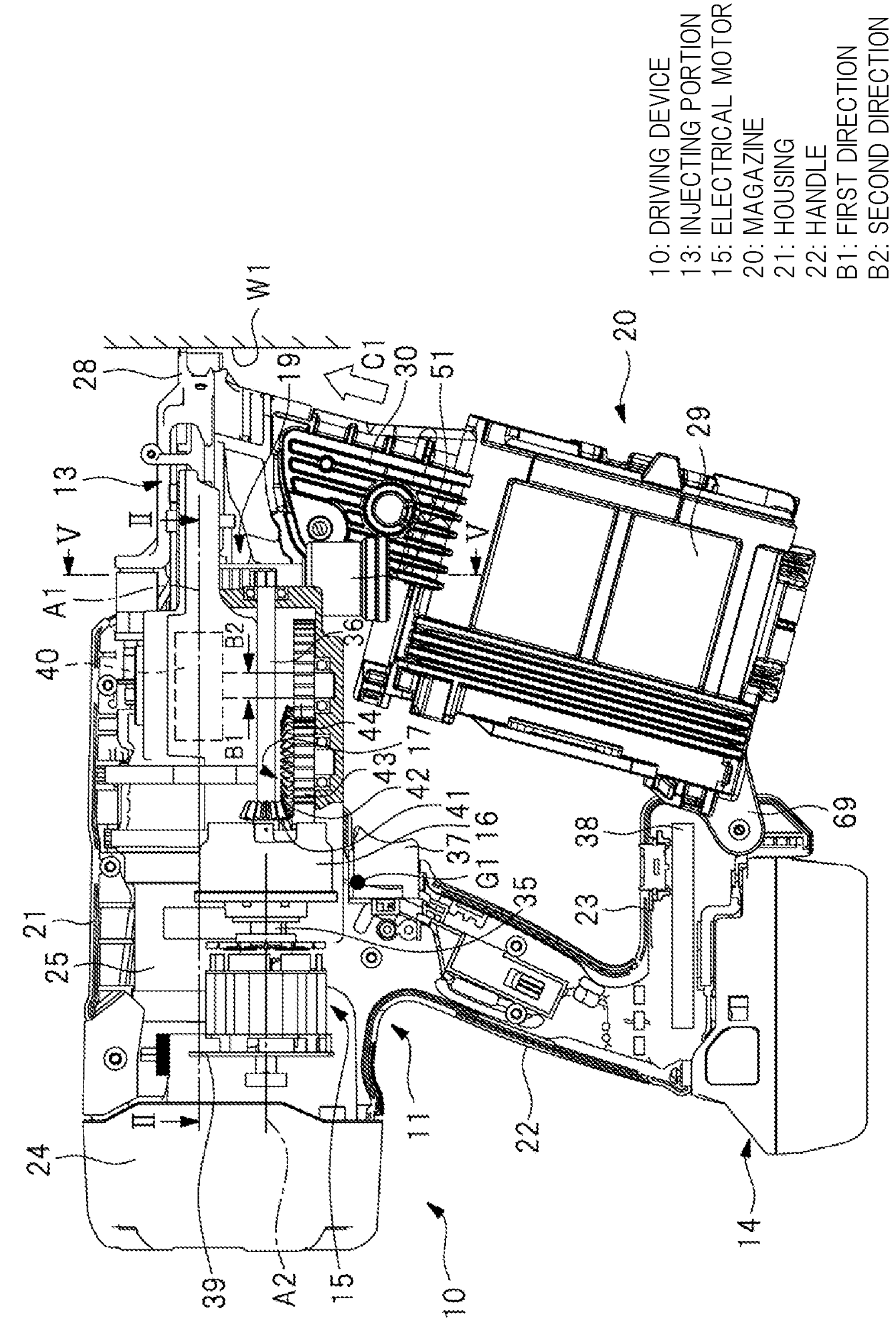
FIG. 1 is a front cross-sectional view showing a driving device of a first embodiment of the present invention.
Figure 2:
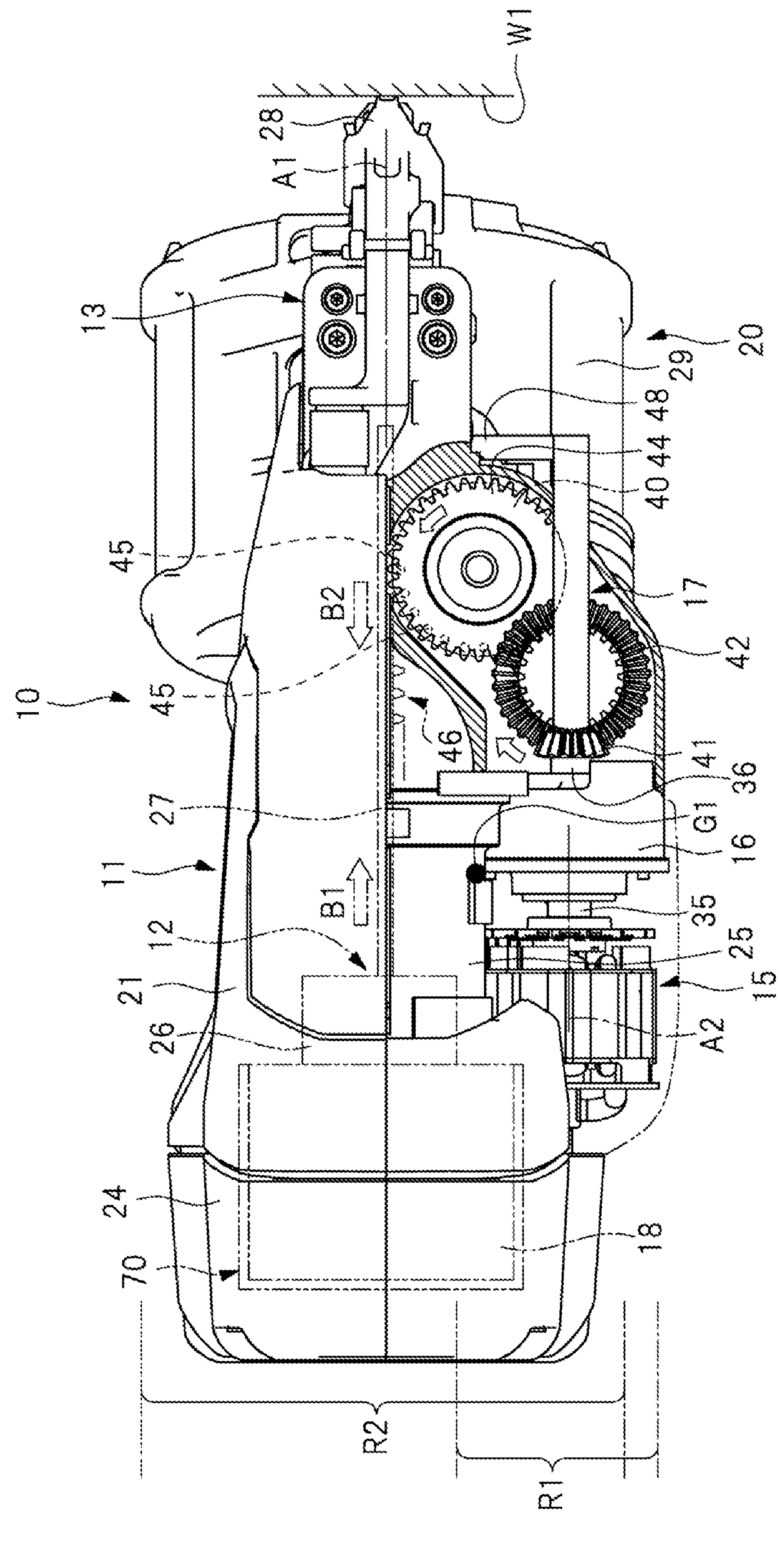
FIG. 2 is a cross-sectional view taken along a line II-II of the driving device of FIG. 1.

A driving device 10 shown in FIGS. 1 and 2 includes a body 11, a striking portion 12, an injecting portion 13, a power supply portion 14, an electrical motor 15, a speed reducer 16, a power transmitting portion 17, a pressure room 18, a feeding portion 19, a magazine 20 and a control portion 38. The body 11 includes a housing 21, a handle 22 protruding from the housing 21, and a mounting portion 23 connected to an end of the handle 22, the end being opposite to the housing 21.

A head cover 24 is fixed to the housing 21. The cylinder 25 is housed inside the housing 21. An accumulator 70 is arranged inside the housing 21 and inside the head cover 24. The accumulator 70 is fixed to the cylinder 25. The pressure room 18 is formed over inside of the cylinder 25 and inside of the accumulator 70.

The striking portion 12 includes a piston 26 and a driver blade 27. The piston 26 and the driver blade 27 may be a unified component. The piston 26 and the driver blade 27 may be different components, and the piston 26 and the driver blade 27 may be fixed to each other. The piston 26 is arranged inside the cylinder 25. The striking portion 12 is reciprocable in a direction along a center line A1 of the cylinder. The striking portion 12 is allowed to move for striking the fastener. The housing 21 indirectly support the striking portion 12 through the cylinder 25.

The pressure room 18 is filled with compressed fluid. As the compressed gas, air or inert gas is allowed to be used. Examples of the inert gas include nitrogen gas and rare gas. In the present specification, an example of the pressure room 18 filled with the air will be explained. The piston 26 receives an air pressure of the pressure room 18, and the striking portion 12 is biased in a first direction B1 by the air pressure. A bumper made of a synthetic rubber is arranged inside the cylinder 25. The driver blade 27 includes a rack 46. The rack 46 is made of protrusions that are arranged in the moving direction to sandwich a gap therebetween.

The injecting portion 13 is attached to the housing 21. The injecting portion 13 includes an injecting path 34 shown in FIG. 5. The injecting path 34 is a hole or a space extending in the direction along the center line A1. The driver blade 27 is movable inside the injecting path 34. The injecting portion 13 guides the moving direction of the driver blade 27 to be along the center line A1, and determines a nail driving-in direction. A push lever 28 is attached to the injecting portion 13. The push lever 28 is in contact with and away from a workpiece W1 to which the nail is driven in (hit).

Note that FIGS. 1 and 2 show a state in which a tip of the push lever 28 is close to a surface of a wall that is one example of the workpiece W1. A push lever switch is arranged in the injecting portion 13. The push lever switch not illustrated detects whether the push lever 28 is in contact with or away from the workpiece W1, and outputs a signal. The signal output from the push lever switch is input to the control portion 38.

The magazine 20 includes a drum portion 29 and a connecting portion 30. An outer appearance of the drum portion 29 is cylindrical. The drum portion is hollow, and the drum portion 29 is allowed to house the nail 31. The drum portion 29 is supported to the mounting portion 23 by a bracket 69. As shown in FIG. 1, the magazine 20 protrudes from the injecting portion 13 in the direction crossing the center line A1.

Figure 3:
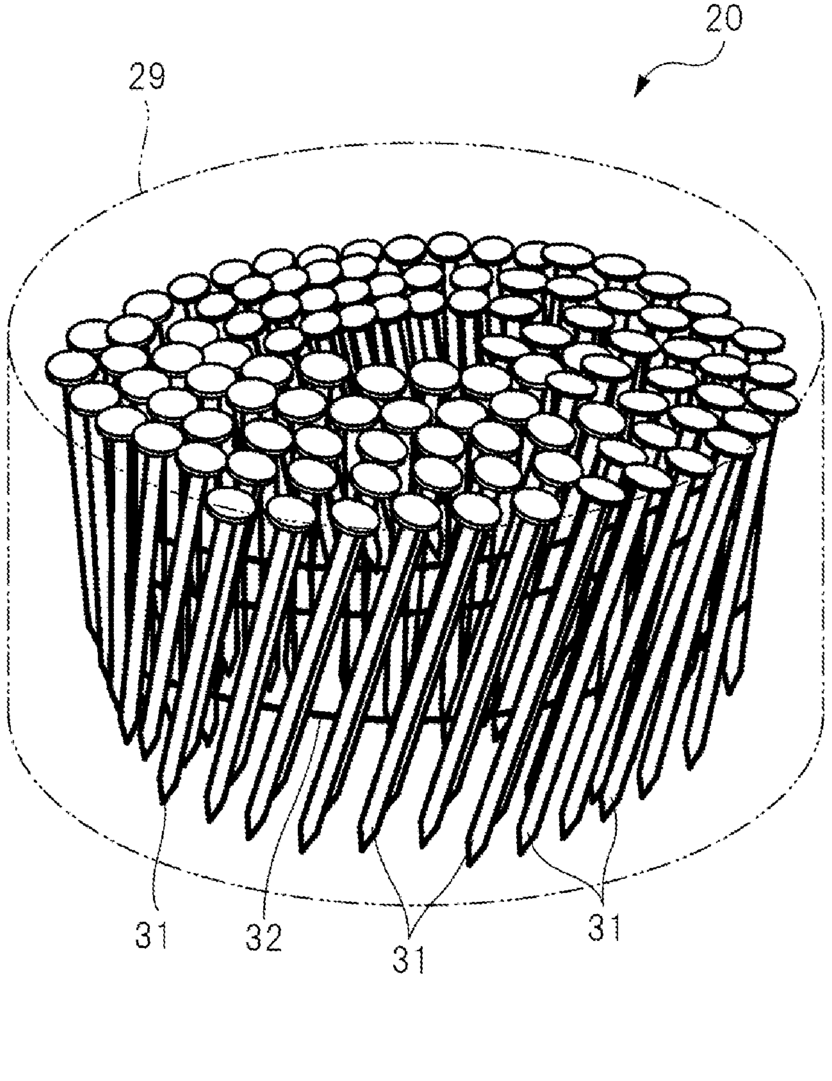
FIG. 3 is a schematic view showing nails housed in the magazine of the driving device.

As shown in FIG. 3, the plurality of nails 31 are connected to one another by a joint wire 32, and the plurality of nails 31 are arranged inside the drum portion 29 while being wound spirally, in other words, in the roll form. The connecting portion 30 is connected to the drum portion 29, and the connecting portion 30 is fixed to the injecting portion 13. The connecting portion 30 includes a feeding path 33, and the feeding path 33 communicates with inside of the drum portion 29 and the injecting path 34. The feeding path 33 guides the nail 31 from the inside of the drum portion 29 to the injecting path 34.

The electrical motor 15 is arranged inside the housing 21, and is supported by the housing 21. The electrical motor 15 is a brushless motor. A center line A2 that is a rotary center of the rotary shaft 35 of the electrical motor 15 is in parallel to the center line A1. In other words, the center line A2 of the electrical motor 15 is arranged to cross a plane orthogonal to the center line A1 of the cylinder. The electrical motor 15 is arranged to be adjacent to the cylinder 25. As shown in FIG. 1, the center line A2 of the electrical motor 15 is closer to the handle 22 than the center line A1. Note that the center line A2 of the electrical motor 15 may cross the center line A1 at an angle that is different from 90 degrees. The speed reducer 16 is arranged inside the housing 21. The speed reducer 16 and the power transmitting portion 17 are arranged between the electrical motor 15 and the injecting portion 13 in the direction along the center line A2. The speed reducer 16 is arranged between the electrical motor 15 and the power transmitting portion 17 in the direction along the center line A2. The speed reducer 16 includes an input element, a planet gear mechanism and an output element 36. The input element is connected to the rotary shaft 35. The speed reducer 16 reduces a rotary speed of the output element 36 to be lower than a rotary speed of the input element, and amplifies a rotary force, that is a torque.

The power supply portion 14 is a direct-current power supply allowed to supply power to the electrical motor 15. The power supply portion 14 is a battery pack including a container case and a plurality of battery cells contained in the container case. The battery cell is a dischargeable secondary battery. As the battery cell, a publicly-known battery cell such as a lithium ion battery, a nickel hydrogen battery, a lithium ion polymer battery and a nickel cadmium battery can be optionally used.

As shown in FIG. 1, the handle 22 protrudes from an outer surface of the housing 21 in the direction crossing the center line A1. The handle 22 has a tubular or rod shape. The direction of the protrusion of the handle 22 from the outer surface of the housing 21 and the direction of protrusion of the magazine 20 from the injecting portion 13 are substantially the same as each other. FIG. 1 shows an example of a first virtual plane expanding along the center line A1 that is the moving direction of the striking portion 12 and along the direction of protrusion of the handle 22 from the housing 21. The first virtual plane can be defined as a front view of the driving device 10. A structure of the front view of the driving device 10 is illustrated in FIG. 1.

Figure 4:
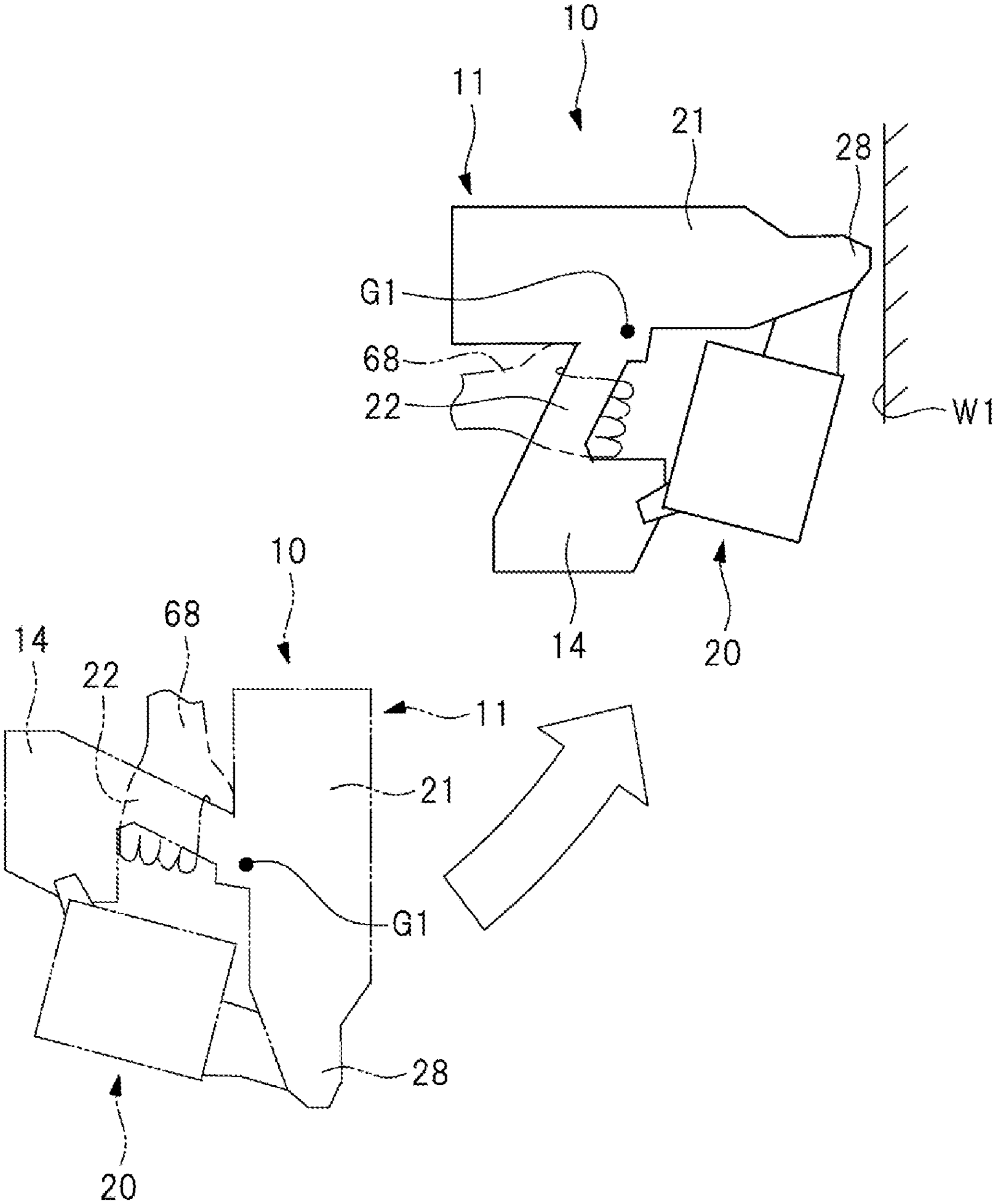
FIG. 4 is a schematic view showing a moving example of the driving device.

The trigger 37 is attached to the handle 22. The trigger 37 is movable relative to the handle 22. A user can grab the handle 22 with his/her hand 68 as shown in FIG. 4, and apply/release an operational force to/from the trigger 37 by using his/her finger. The trigger 37 is arranged between a center position of the handle 22 and the outer surface of the housing 21 in the direction of the protrusion of the handle 22 from the housing 21.

The control portion 38 is arranged inside the mounting portion 23. The control portion 38 is a microcomputer including a circuit board, an input/output port, a storage circuit, a calculation processing unit and others. A circuit board 39 is arranged inside the housing 21, and a trigger switch is arranged inside the handle 22. The trigger switch detects whether the operational force is applied to or released from the trigger 37, and outputs a signal. The signal that is output from the trigger switch is input to the control portion 38. An inverter circuit is arranged in the circuit board 39. The inverter circuit is arranged in an electrical circuit between the battery cell of the power supply portion 14 and the electrical motor 15. The inverter circuit includes a plurality of switching elements.

Further, a position detecting sensor and a phase detecting sensor are arranged inside the housing 21. The position detecting sensor detects a position of the striking portion 12 in the direction along the center line A1, and outputs a signal. The phase detecting sensor detects a phase of the electrical motor 15 in the rotary direction, and outputs a signal. The control portion 38 processes the signal output from the trigger switch, the signal output from the push lever switch, the signal output from the position detecting sensor and the signal output from the phase detecting sensor, and controls the inverter circuit. The control portion 38 is allowed to control the rotation and the stoppage of the electrical motor 15, the rotary speed of the electrical motor 15, and the rotary direction of the electrical motor 15.

An internal structure of the housing 21 will be explained with reference to FIG. 2. FIG. 2 is a cross-sectional view taken along a line II-II of FIG. 1. For convenience, the power transmitting portion 17 is illustrated with a solid line, and a pin wheel 40 is illustrated with a dashed double-dotted line.

The power transmitting portion 17 and the pin wheel 40 are arranged inside the housing 21. The power transmitting portion 17 and the pin wheel 40 include a function of transmitting the power of the electrical motor 15 to the striking portion 12. The power transmitting portion 17 includes a driving bevel gear 41, a driven bevel gear 42, a first spur gear 43, and a second spur gear 44. The driving bevel gear 41 is fixed to the output element 36 of the speed reducer 16. The driven bevel gear 42 is engaged with the driving bevel gear 41. The first spur gear 43 is allowed to rotate together with the driven bevel gear 42. The second spur gear 44 is engaged with the first spur gear 43. The pin wheel 40 is allowed to rotate together with the second spur gear 44, and the pin wheel 40 includes a plurality of pinion pins 45 that are arranged to sandwich a gap therebetween in the rotary direction.

By the rotation of the pin wheel 40, the plurality of pinion pins 45 are independently engaged with or released from the rack 46 of the driver blade 27. By the rotation of the pin wheel 40 and the engagement of at least one pinion pin 45 with the rack 46, the power of the electrical motor 15 is transmitted to the striking portion 12. Therefore, the striking portion 12 moves in the second direction B2 to be against the air pressure of the pressure room 18 as shown in FIG. 2. The second direction B2 is opposite to the first direction B1. By the release of all pinion pines 45 from the rack 46, the power of the electrical motor 15 is not transmitted to the striking portion 12.

Figure 5:
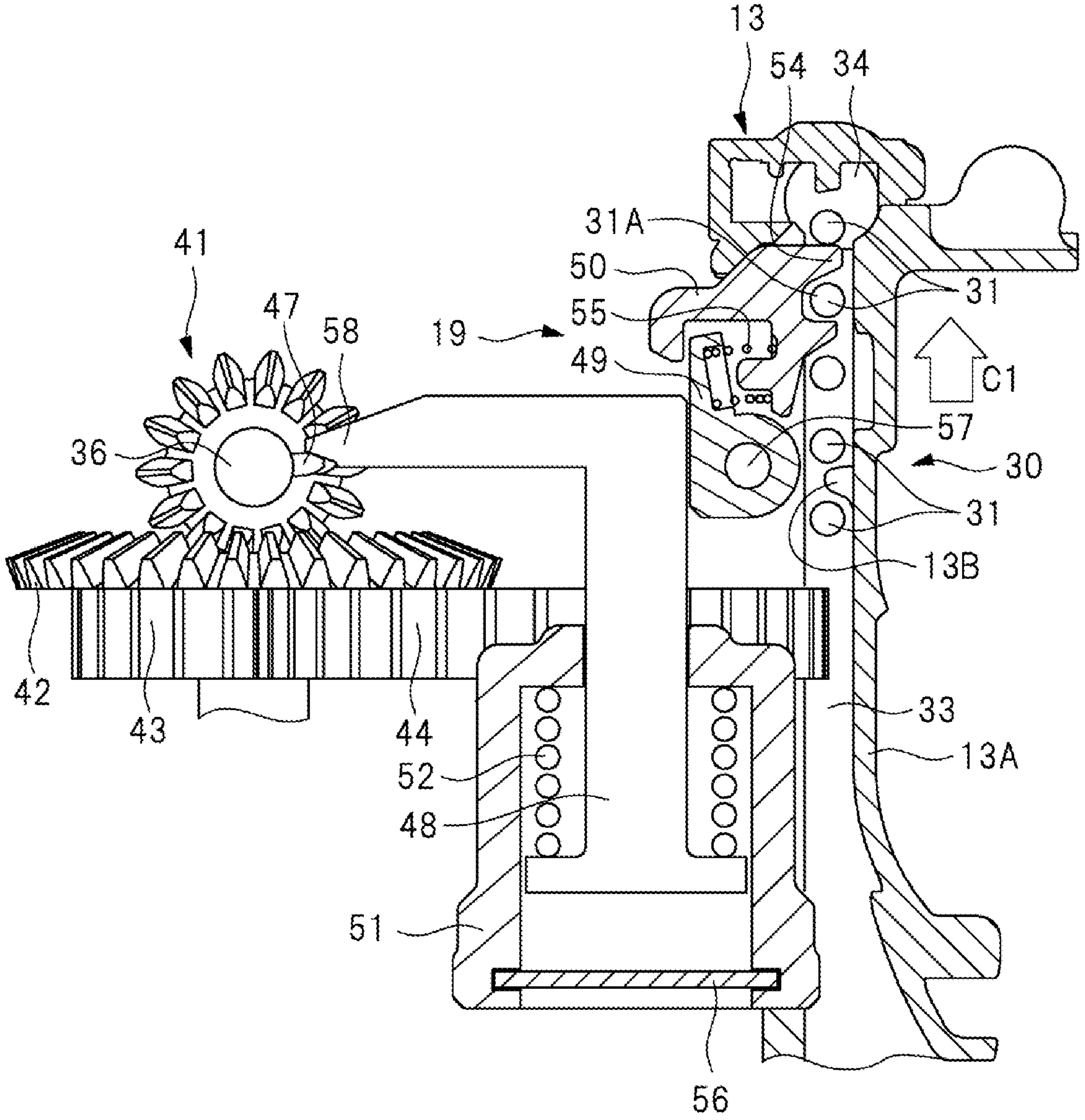
FIG. 5 is a side cross-sectional view taken along a line V-V of FIG. 1, showing a stop state of a feeding portion included in the driving device.

The feeding portion 19 is formed over the inside of the housing 21 and the connecting portion 30 as illustrated in FIG. 5. The injecting portion 19 is a device that feeds the nail 31 housed in the magazine 20 to the injecting path 34. The feeding portion 19 includes an engaging portion 47, a feeding piston 48, a feeder arm 49 and a feeder 50. The engaging portion 47 protrudes from an outer circumferential surface of the output element 36.

A tubular holder 51 is fixed to the injecting portion 13. The feeding piston 48 is reciprocable along the direction of the protrusion of the connecting portion 30 from the injecting portion 13. Further, the injecting portion 13 includes an openable injecting-portion cover 13A. The injecting-portion cover 13A is configured to make its side surface open, the side surface being opposite to the region with the feeder 50 across the feeding path 33. The injecting-portion cover 13A includes a reverse stop pawl 13B. The reverse stop pawl 13B is arranged in the feeding path 33. The reverse stop pawl 13B is movable relative to the injecting-portion cover 13A. The reverse stop pawl 13B in the feeding path 33 is allowed to escape from the path in which the nail 31 travels.

A spring 52 is arranged inside the holder 51, and the spring 52 biases the feeding piston 48 in a direction of being away from the injecting portion 13. A stopper 56 is attached to the holder 51, and the feeding piston 48 that is biased by the spring 52 stops when being in contact with the stopper 56. The feeding piston 48 includes an engaging portion 58. By the rotation of the output element 36, the engaging portion 47 is engaged with or released from the engaging portion 58.

The feeder arm 49 is fixed to the feeding piston 48. The feeder 50 is movable within a range of a predetermined angle around a support shaft 57 of the feeder arm 49. The feeder 50 includes a protrusion 54. A spring 55 is arranged between the feeder arm 49 and the feeder 50. The spring 55 biases the feeder 50 in a direction of being close to the feeding path 33.

Next, an application example of the driving device 10 will be explained. When detecting at least either one of the release of the operational force from the trigger 37 and the separation of the push lever 28 from the workpiece W1, the control portion 38 controls the inverter circuit to stop the supply of the power to the electrical motor 15. Therefore, the electrical motor 15 stops, and the striking portion 12 stops at a standby position. For convenience, the standby position of the striking portion 12 will be explained to be in a state in which the piston 26 is away from the bumper. The standby position of the striking portion 12 is a position close to a top dead center. The top dead center of the striking portion 12 is a position at which the piston 26 is the farthest from the injecting portion 13 in the direction along the center line A1.

The air pressure of the pressure room 18 is always applied to the striking portion 12, and the moving power received by the striking portion 12 is transmitted to the pin wheel 40 through the rack 46. A rotary limitation mechanism arranged in the speed reducer 16 prevents the rotation of the output element 36, and stops the striking portion 12 at the standby position.

When detecting that the operational force is being applied to the trigger 37 while the push lever 28 is being in contact to the workpiece W1, the control portion 38 controls the inverter circuit to supply the power of the power supply portion 14 to the electrical motor 15 to rotate the electrical motor 15. The rotary force of the electrical motor 15 is transmitted to the pin wheel 40 through the speed reducer 16, the driving bevel gear 41, the driven bevel gear 42, the first spur gear 43 and the second spur gear 44.

Therefore, the striking portion 12 is moved in the second direction B2, in other words, is ascended. By the ascent of the striking portion 12, the pressure of the pressure room 18 is increased. Then, by the release of all the pinion pins 45 from the rack 46, the striking portion 12 is moved in the first direction B1, in other words, is descended by the pressure of the pressure room 18. By the descent of the striking portion 12, the driver blade 27 strikes one nail 31 in the injecting path 34, and the nail 31 is driven in to the workpiece W1. After the nail 31 is driven in to the workpiece W1, the piston 26 collides with the bumper.

The control portion 38 process the signal output from the position detecting sensor, detects the position of the striking portion 12 in the direction of the center line A1, and detects whether the striking portion 12 has reached the standby position or not. When the striking portion 12 has reached the standby position, the control portion 38 stops the electrical motor 15.

In the first virtual plane shown in FIG. 1 in the driving device 10, the arrangement region of the electrical motor 15 and the arrangement region of the magazine 20 are at least partially different from each other. Specifically, in the direction along the center line A1, the arrangement region of the electrical motor 15 and the arrangement region of the magazine 20 are entirely different from each other. And, in the direction of the protrusion of the handle 22 and the magazine 20 from the housing 21 in FIG. 1, the arrangement region of the electrical motor 15 and the arrangement region of the magazine 20 are at least partially different: each other. Specifically, the arrangement region of the electrical motor 15 and the arrangement region of the magazine 20 are entirely different from each other.

The electrical motor 15, the speed reducer 16 and the power transmitting portion 17 are arranged inside the housing 21, and the electrical motor 15, the speed reducer 16 and the power transmitting portion 17 are arranged near the center line A2 between the center line A1 and the magazine 20 in this order from the region of the head cover 24. Therefore, the heavy speed reducer 16 can be arranged at a connecting portion of the handle 22 with the housing 21. And, the electrical motor 15 and the power transmitting portion 17 can be arranged on both sides of the speed reducer 16 in the direction along the center line A2. Therefore, a center of gravity G1 of the driving device 10 is positioned at the connecting portion of the handle 22 with the housing 21 in the driving device 10 shown in FIG. 1.

In a state in which the surface of the workpiece W1 crosses the horizontal plane as similar to the case of the workpiece W1 serving as the wall, circumstances of posture change of the driving device 10 by the user who is gripping the handle 22 with his/her hand 68 will be exemplified as shown in FIG. 4. According to this, when the user changes the posture of the driving device 10 by applying the operational force to the handle 22, a distance from a portion of the handle 22 gripped with the hand 68 to the center of gravity G1, that is a moment arm, can be shortened as small as possible. In other words, the operational force applied to the handle 22 by the user in order to change the posture of the driving device 10 can be reduced. Therefore, operability for lifting a tip of the push lever 28 and bringing the tip of the push lever 28 close to the workpiece W1 is improved.

FIG. 2 shows an example of a second virtual plane being along the moving direction of the striking portion 12 and crossing the direction of the protrusion of the handle 22 from the housing 21. The second virtual plane can be defined as a side surface of the driving device 10.

In a direction that is substantially at a right angle with respect to the center line A1 in FIG. 2, an arrangement region of the electrical motor 15 and an arrangement region of the magazine 20 at least partially overlap each other. The electrical motor 15, the speed reducer 16 and the power transmitting portion 17 are arranged on one side across the center line A1 in FIG. 2. The center of gravity G1 is arranged between the center line A1 and the center line A2.

Further, the electrical motor 15 and the speed reducer 16 are arranged inside the housing 21. Therefore, the protrusion mechanism from the housing 21 can be reduced, and the contact portion between the tip of the push lever 28 and the workpiece W1 can be easily visually observed. In this case, the workpiece W1 may be any of the wall, a floor, a ceiling and others.

Next, the movement of the feeding portion 19 will be explained. At the moment at which the striking portion 12 stops at the standby position, that is the moment before the driver blade 27 strikes the nail 31, the engaging portion 47 and the engaging portion 58 engage with each other while the output element 36 stops as shown in FIG. 5. Therefore, the feeding piston 48 stops at a position at which the feeding piston is close to the injecting portion 13. Further, the protrusion 54 of the feeder 50 stops in contact with the nail 31 at a first position in a feeding direction “C1” of the nails 31. The protrusion 54 is positioned between the first nail 31 in the feeding direction C1 and a second nail 31 in the feeding direction C1. The first nail 31 in the feeding direction C1 is positioned at the injecting path 34.

Figure 6:
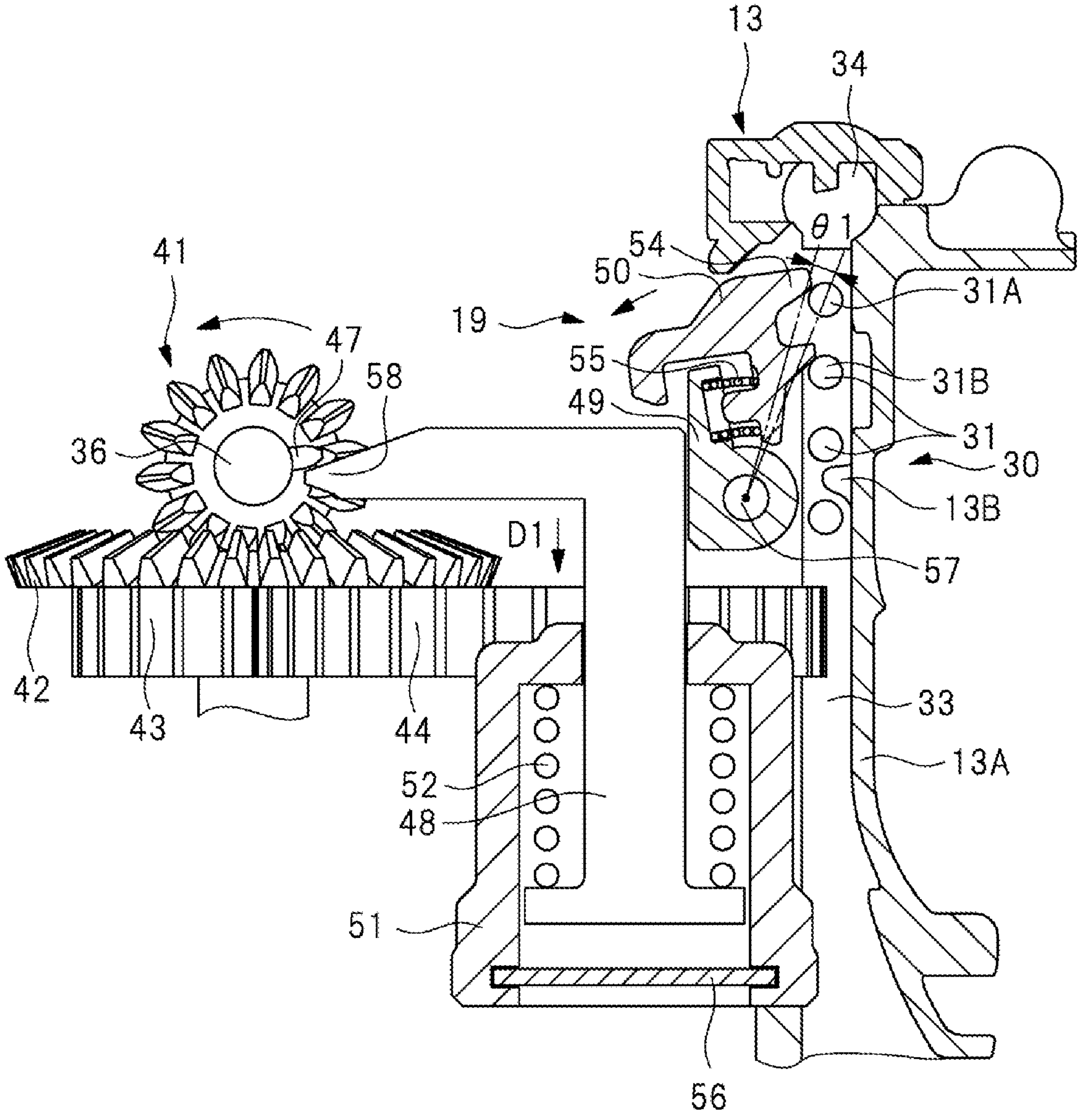
FIG. 6 is a side cross-sectional view taken along the line V-V of FIG. 1, showing a movement state of the feeding portion after the striking of the nail by the driver blade.

When the engaging portion 47 oversteps the engaging portion 58 as shown in FIG. 6 after the output element 36 rotates counterclockwise to cause the driver blade 27 to strike the nail 31 positioned at the injecting path 34, the feeding piston 48 is moved in a direction D1 being away from the injecting portion 13 by the force of the spring 52. By the movement of the feeding piston 48, the protrusion 54 is pressed against the first nail 31A in the feeding direction C1 among the nails 31 in the feeding path 33, and the feeder 50 moves counterclockwise by a predetermined angle “θ1”.

Figure 7:
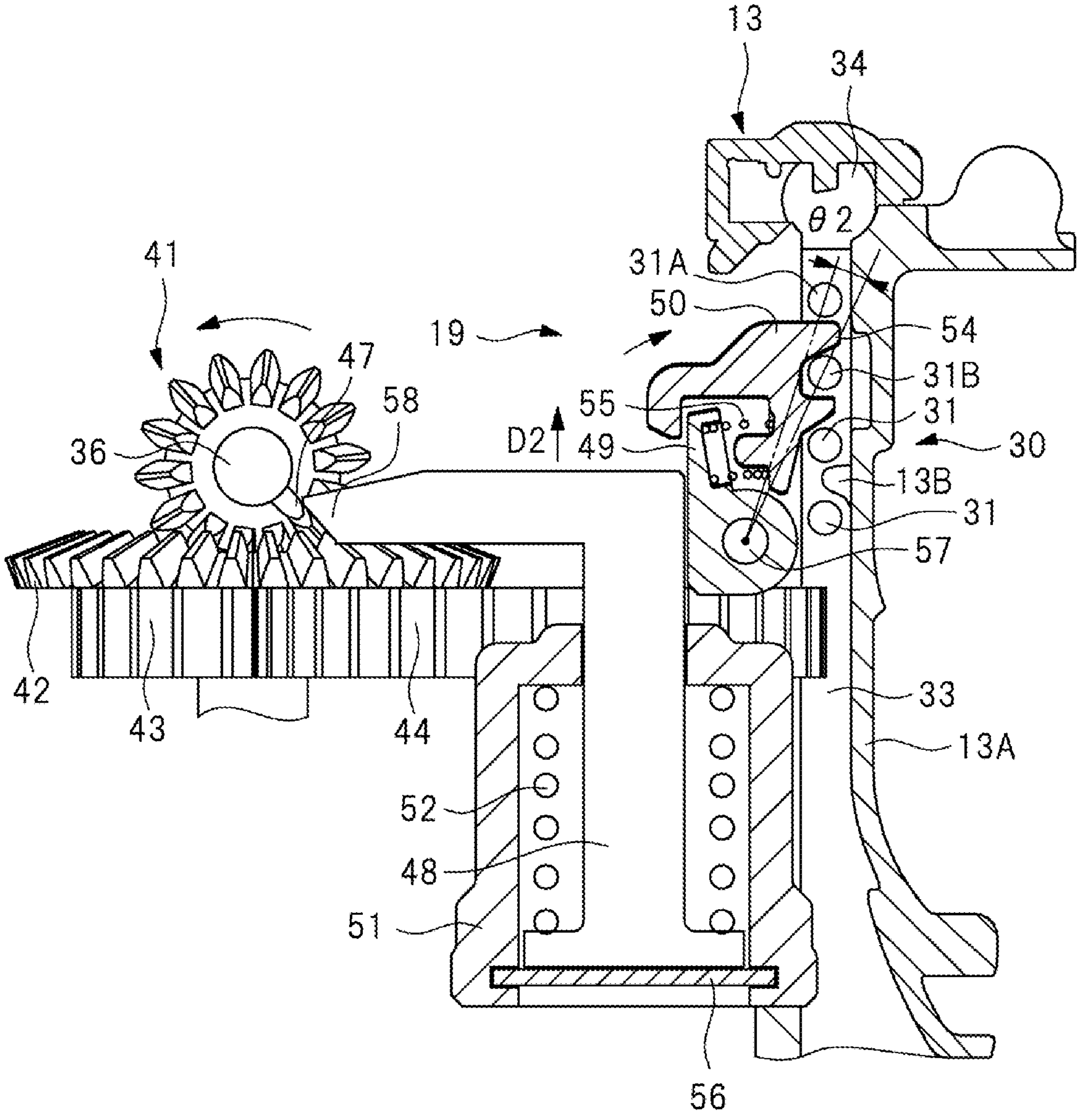
FIG. 7 is a side cross-sectional view taken along the line V-V of FIG. 1, showing a state of moving the feeding portion to feed the nail to an injecting path.

When the protrusion 54 oversteps the first nail 31A in the feeding direction C1, the feeder 50 moves clockwise by a predetermined angle “θ2” because of the bias force of the spring 55. Therefore, the protrusion 54 enters between the first nail 31A and the second nail 31B as shown in FIG. 7. When the protrusion 54 oversteps the first nail 31A, note that the reverse stop pawl 13B prevents other nails 31 from moving in an opposite direction to the feeding direction C1. The reverse stop pawl 13B can move backward from the feeding path 33, and does not interrupt the movement of the nail 31 at the time of the movement of the nail 31 in the feeding direction C1. Further, when the engaging portion 47 is engaged with the engaging portion 58 by the rotation of the output element 36, the feeding piston 48 is moved in a direction D2 being close to the injecting portion 13 to be against the force of the spring 52 as shown in FIG. 5.

Therefore, the output element 36 stops while the protrusion 54 of the feeder 50 feeds the first nail 31 to the injecting path 34 in the feeding direction C1 and the engaging portion 47 engages with the engaging portion 58 as shown in FIG. 5. As described above, the electrical motor 15 has both the function of moving the striking portion 12 in the second direction B2 and the function of moving the feeding piston 48 and the feeder arm 49 in the direction D2.

Inside the second virtual plane shown in FIG. 2, the arrangement region R1 of the electrical motor 15 and the arrangement region R2 of the magazine 20 partially overlap each other in the direction crossing the center line A1 that is the same as the moving direction of the striking portion 12. Therefore, increase in a lateral width of the driving device 10 can be suppressed.

Second Embodiment

Figure 8:
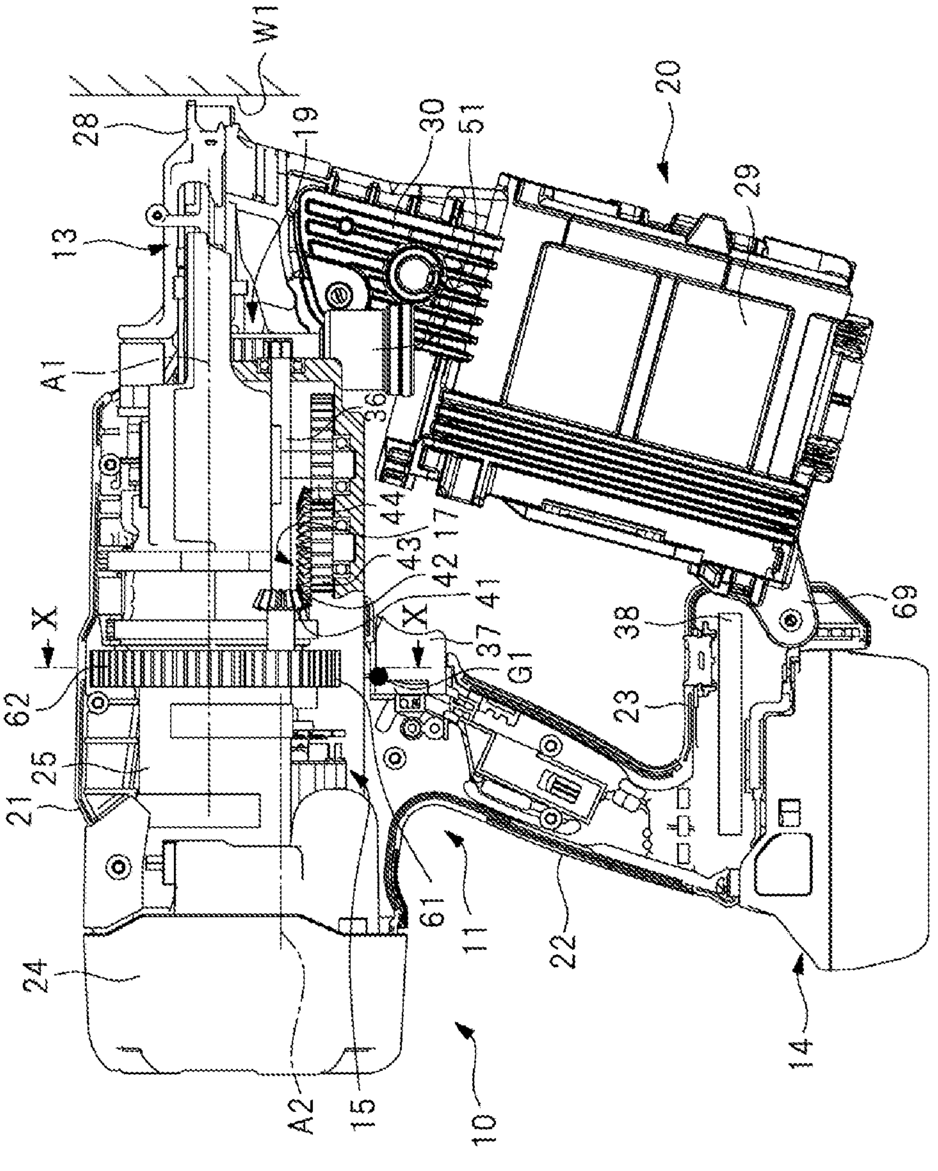
FIG. 8 is a front cross-sectional view showing a driving device of a second embodiment.
Figure 9:
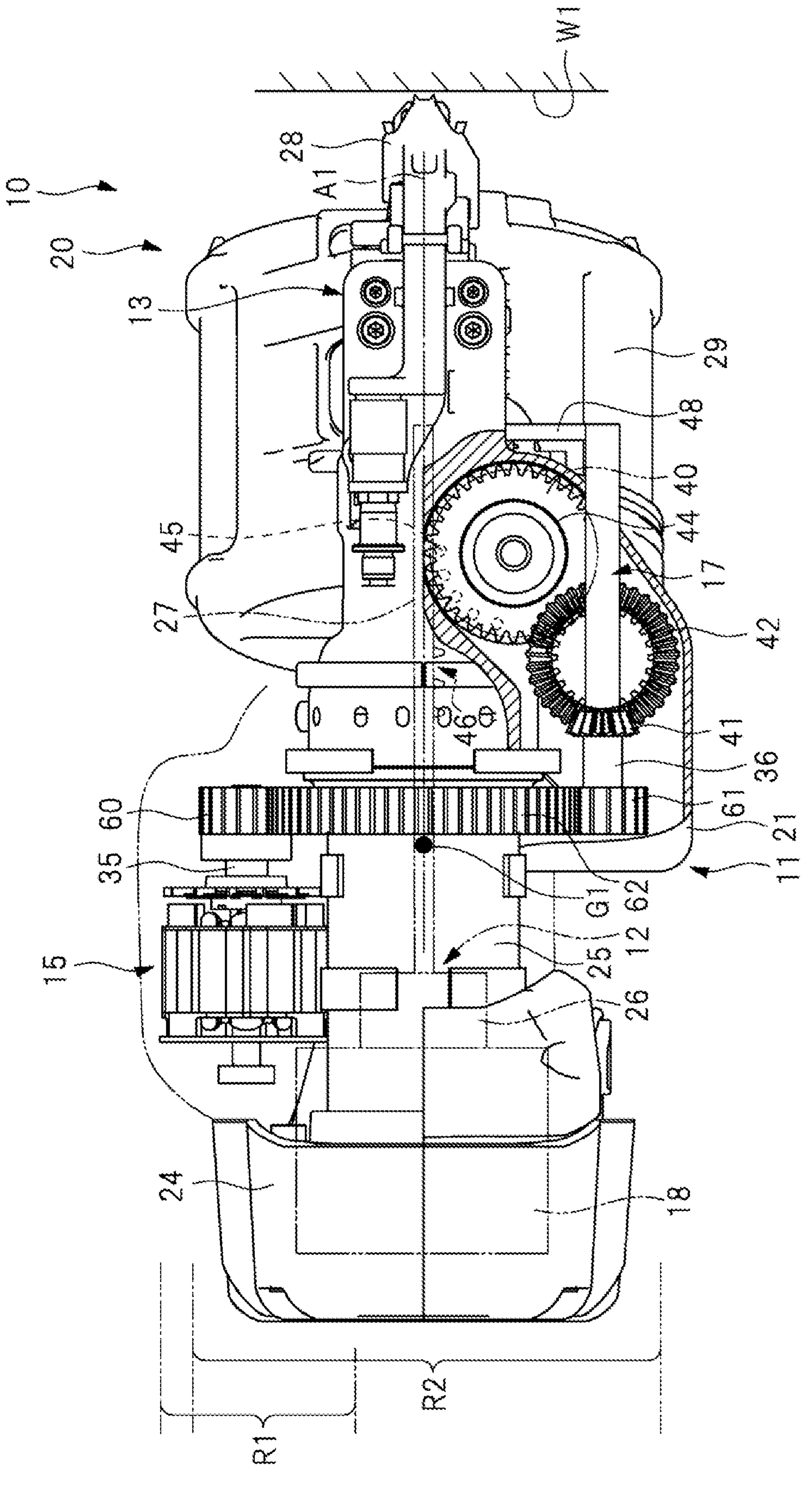
FIG. 9 is a planar cross-sectional view of the driving device of FIG. 8.
Figure 10:
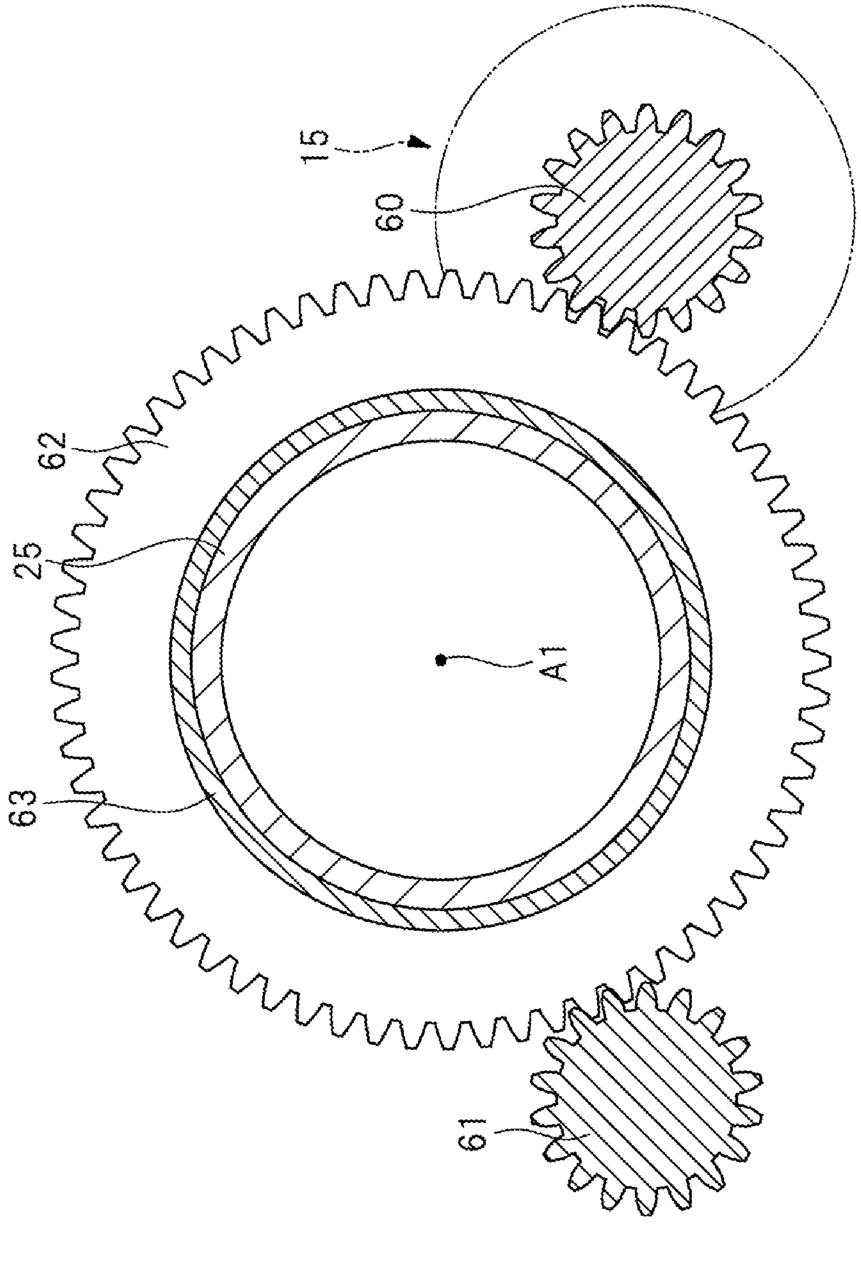
FIG. 10 is a side cross-sectional view taken along a line X-X of FIG. 8.

A power transmitting portion 17 in a driving device 10 shown in FIGS. 8 and 9 includes a third spur gear 60, a fourth spur gear 61, a large gear 62, a driving bevel gear 41, a driven bevel gear 42, a first spur gear 43, a second spur gear 44 and a pin wheel 40. The third spur gear 60 is fixed to the rotary shaft 35. As shown in FIG. 10, the large gear 62 is annular, and is arranged while taking the center line A1 as its center. An inner diameter of the large gear 62 is larger than an outer diameter of the cylinder 25, and the large gear 62 is supported by the cylinder 25 through a bearing 63. Therefore, the large gear 62 is rotatable around the center line A1.

The third spur gear 60 is meshed with the large gear 62. The fourth spur gear 61 is meshed with the larger gear 62, and the fourth spur gear 61 does not revolve around the center line A1. The fourth spur gear 61 is rotatable together with the driving bevel gear 41. An arrangement region of the third spur gear 60 and an arrangement region of the fourth spur gear 61 are different from each other in a rotary direction of the large gear 62.

Other configurations of the driving device 10 shown in FIGS. 8 and 9 are the same as those of the driving device 10 shown in FIGS. 1 and 2. The driving device shown in FIGS. 8 and 9 includes the feeding portion 19 shown in FIG. 6. Note that FIGS. 8 and 9 show that the tip of the push lever 28 is close to the surface of the wall that is one example of the workpiece W1.

In the driving device 10 shown in FIGS. 8 and 9, the rotary force of the electrical motor 15 is transmitted to the driving bevel gear 41 through the third spur gear 60, the large gear 62 and the fourth spur gear 61. The striking portion 12 shown in FIG. 9 moves as similar to the striking portion 12 shown in FIG. 2.

In the driving device 10, the arrangement region of the electrical motor 15 and the arrangement region of the cylindrical-shape magazine 20 are at least partially different from each other in the first virtual plane shown in FIG. 8. Specifically, in the direction along the center line A1, the arrangement region of the electrical motor 15 and the arrangement region of the magazine 20 are entirely different from each other. And, in the direction of the protrusion of the handle 22 from the housing 21 in FIG. 8, the arrangement region of the electrical motor 15 and the arrangement region of the magazine 20 are entirely different from each other. Further, the electrical motor 15 and the power transmitting mechanism 17 are separately arranged on both sides of the striking portion 12. Therefore, when the user lifts the driving device 10 while gripping the handle 22 with the hand as shown in FIG. 4, the operability for bringing the tip of the push lever 28 close to the workpiece W1 is improved.

The electrical motor 15, the speed reducer 16 and the power transmitting portion 17 are arranged inside the housing 21. Further, near the center line A2 between the center line A1 and the magazine 20 in FIG. 8, the electrical motor 15 and the power transmitting portion 17 are arranged in this order sequentially from a region of the head cover 24. The power transmitting portion 17 includes the third spur gear 60, the fourth spur gear 61 and the large gear 62. The heavy third spur gear 60 and fourth spur gear 61 are arranged at the connecting portion between the handle 22 and the housing 21.

Further, the electrical motor 15, the driving bevel gear 41, the driven bevel gear 42, the first spur gear 43, the second spur gear 44 and the pin wheel 40 can be arranged on both sides of the third spur gear 60 and the fourth spur gear 61 in the direction along the center line A1. Therefore, the center of gravity G1 of the driving device 10 is positioned at the connecting portion between the handle 22 and the housing 21 shown in FIG. 8. Therefore, when the user changes the posture of the driving device 10 by applying the operational force to the handle 22, the necessary operational force can be reduced.

Further, inside the second virtual plane shown in FIG. 9, the arrangement region R1 of the electrical motor 15 and the arrangement region R2 of the magazine 20 partially overlap each other in the direction crossing the center line A1 that is along the moving direction of the striking portion 12. Therefore, increase in a lateral width of the driving device 10 can be suppressed.

Further, in FIG. 9, the center line A1 is arranged between a region of the electrical motor 15 and the third spur gear 60 and a region of the fourth spur gear 61, the driving bevel gear 41 and the driven bevel gear 42. The center of gravity G1 is arranged to overlap the center line A1. Therefore, when the user brings the tip of the push lever 28 to contact with the workpiece W1 while lifting the driving device 10 as shown in FIG. 4, tilt of the driving device 10 toward either the right side or the left side can be suppressed, and the posture of the driving device 10 can be easily kept.

Further, the electrical motor 15 is arranged inside the housing 21. Therefore, the protrusion mechanism from the housing 21 can be reduced, and the contact portion between the tip of the push lever 28 and the workpiece W1 can be easily visually observed. In this case, the workpiece W1 is not limited to a portion such as the wall, a floor, a ceiling or others.

Modification Example

Figure 11:
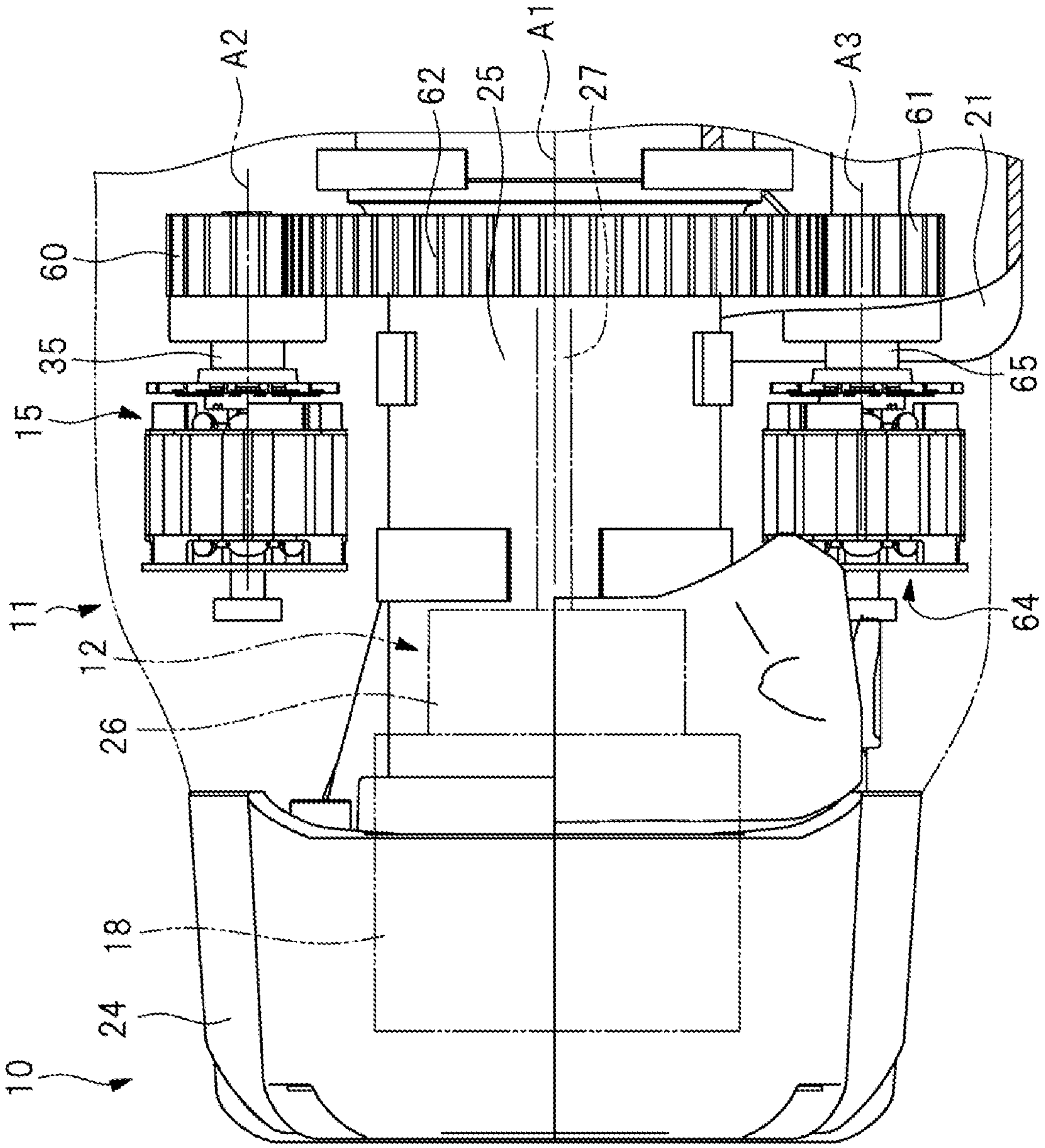
FIG. 11 is a partial planar cross-sectional view showing a change example of the driving device of FIG. 8.

FIG. 11 is a change example of a part of the driving device 10 shown in FIG. 9. A dedicated electrical motor 64 that drives the fourth spur gear 61 is arranged. The electrical motor 64 is arranged inside the housing 21, and a rotary shaft 65 of the electrical motor 64 is connected to the fourth spur gear 61. The control portion 38 controls the rotation and the stoppage of the electrical motor 15. A center line A3 of the electrical motor 64 is in parallel to the center line A1 and the center line A2. The center line A1 is arranged between the center line A2 and the center line A3. Both the rotary force of the electrical motor 15 and a rotary force of the electrical motor 64 are transmitted to the fourth spur gear 61. Other configurations of the driving device 10 shown in FIG. 11 are the same as the configurations of the driving device 10 shown in FIGS. 8 and 9, and can provide the same effect.

Further, since the driving device includes the plurality of electrical motors 15 and 64, a power of each electrical motor can be reduced. Therefore, each electrical motor can be downsized, and a lateral width of the housing 21 can be suppressed.

And, the small torque for driving the striking portion 12 may be acceptable. For example, this case is applied immediately after the striking portion 12 stopping at the bottom dead center moves toward the top dead center or applied when the engagement between the striking portion 12 and the pin wheel 40 is released, or others. In such a case, only either one of the electrical motors 15 and 64 can be driven.

On the other hand, a large torque is often necessary for driving the striking portion 12. This case is applied when, for example, the striking portion 12 is close to the top dead center. In such a case, both the electrical motors 15 and 64 can be driven.

Third Embodiment

Figure 12:
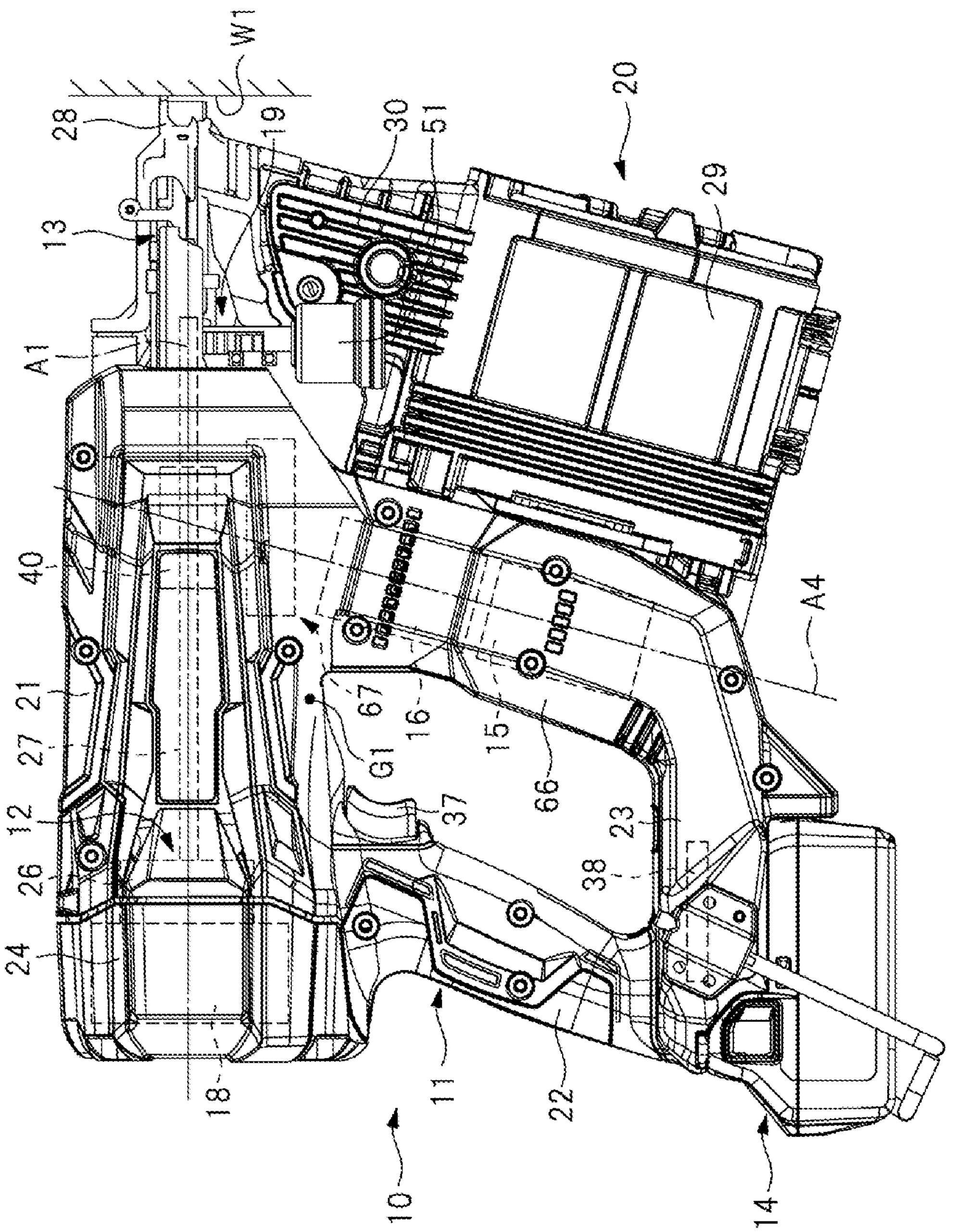
FIG. 12 is a front view showing a driving device of a third embodiment.
Figure 13:
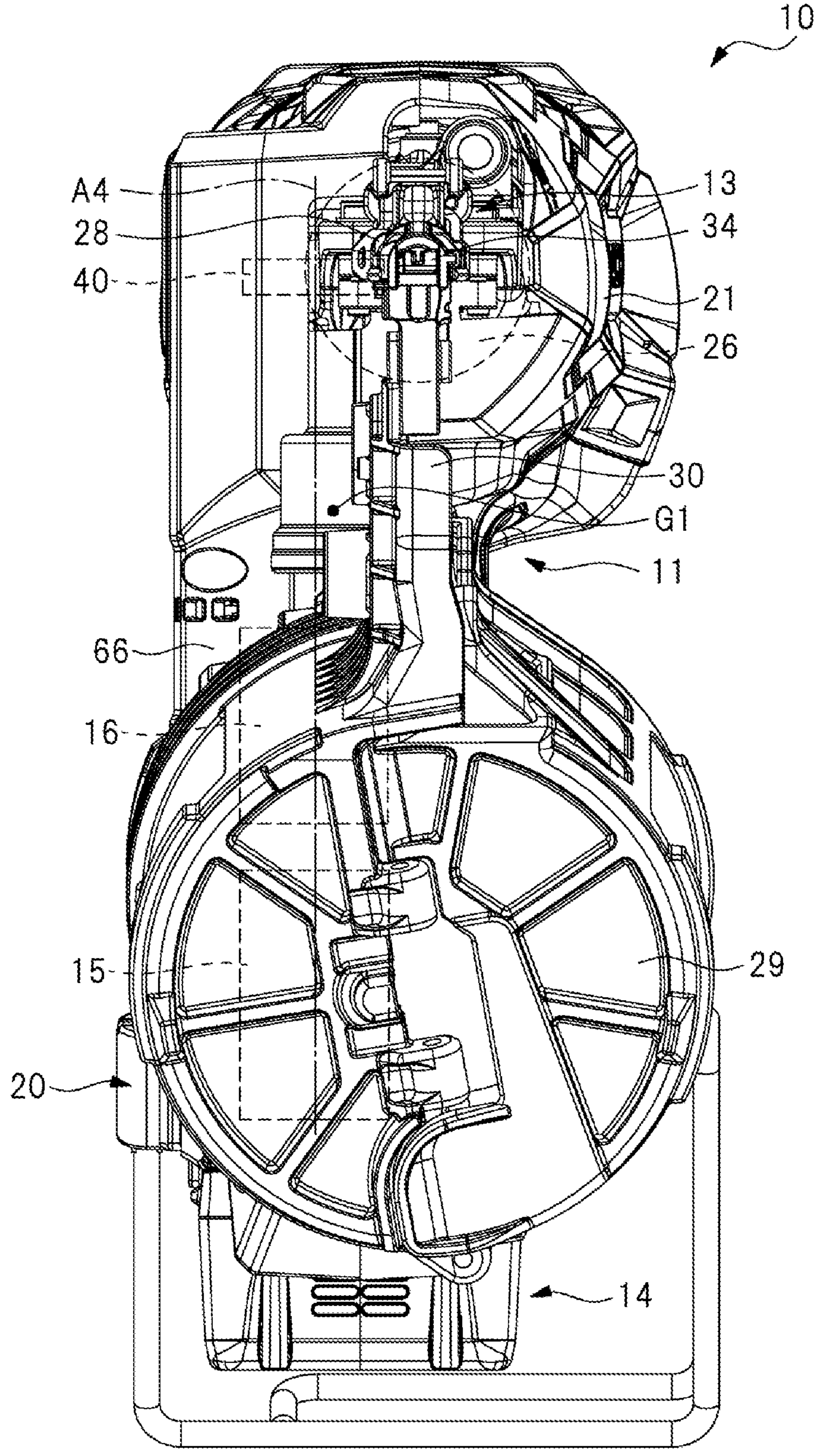
FIG. 13 is a right side view showing the driving device of FIG. 12.

A body 11 of a driving device 10 shown in FIGS. 12 and 13 includes a housing 21, a mounting portion 23, a handle 22 and a motor case 66. The motor case 66 is connected to the mounting portion 23 and the housing 21. The motor case 66 is tubular. A direction of protrusion of the motor case 66 from the housing 21 is substantially the same as the direction of protrusion of the handle 22 from the housing 21. The electrical motor 15 and the speed reducer 16 are arranged inside the motor case 66. The rotary center of the rotary shaft of the electrical motor 15 is a center line A4. The speed reducer 16 is arranged while taking the center line A4 as its center. The speed reducer 16 is arranged between the electrical motor 15 and the housing 21 in a direction along the center line A4. FIG. 12 shows an example in which the center line A1 and the center line A4 cross each other at an angle that is different from 90 degrees. In other words, the center line A4 of the electrical motor 15 crosses a plane orthogonal to the center line A1 of the cylinder. Note that FIG. 12 shows a state in which the tip of the push lever 28 is close to the surface of the wall that is one example of the workpiece W1.

A power transmitting portion 67 is arranged inside the housing 21. The power transmitting portion 67 includes, for example, a gear string. The output element of the speed reducer 16 is connected to the pin wheel 40 through the power transmitting portion 67. The control portion 38 controls the rotation, the stoppage and the rotary speed of the electrical motor 15. The rotary force of the electrical motor 15 is transmitted to the pin wheel 40 through the speed reduced 16 and the power transmitting portion 67. By the rotation of the pin wheel 40, the striking portion 12 shown in FIG. 12 moves as similar to the striking portion 12 shown in FIG. 2.

The driving device 10 shown in FIGS. 12 and 13 includes the feeding portion 19 shown in FIG. 5. A part of the power transmitted from the electrical 1 motor 15 to the power transmitting portion 67 is transmitted to the feeding portion 19 through the output element 36. The nail 31 inside the cylindrical-shape magazine 20 is fed to the injecting path 34 by the feeding portion 19. The driver blade 27 strikes the nail 3 fed to the injecting path 34.

In the driving device 10, the arrangement region of the electrical motor 15 and the arrangement region of the magazine 20 are at least partially different from each other in the first virtual plane shown in FIG. 12. Specifically, in the direction along the center line A1 representing the moving direction of the striking portion 12, the arrangement region of the electrical motor 15 and the arrangement region of the magazine 20 are entirely different from each other. And, in the direction along the center line A1, the motor case 66 is arranged between the handle 22 and the magazine 20. The electrical motor 15 and the speed reducer 16 are arranged inside the motor case 66. Therefore, when the user lifts the driving device 10 while gripping the handle 22 with the hand 68 as shown in FIG. 4, the operability for bringing the tip of the push lever 28 close to the workpiece W1 is improved.

A portion of the motor case 66, the portion being close to the mounting portion 23, is arranged to be upper than a portion of the same, the portion being close to the housing 21. The electrical motor 15, the speed reducer 16 and the power transmitting portion 67 are arranged inside the housing 21. Therefore, the center of gravity G1 of the driving device 10 is arranged between the connecting portion between the handle 22 and the housing 21 and the connecting portion between the motor case 66 and the housing 21 in the direction along the center line A1.

Therefore, when the user changes the posture of the driving device 10 by applying the operational force to the handle 22, the necessary operational force can be reduced. Further, the electrical motor 15 and the speed reducer 16 are arranged between the handle 22 and the magazine 20. Therefore, the lateral width of the housing 21 can be suppressed at the minimum, and the driving-in work to the corner can be easily performed. In other words, the driving-in work to the corner can be easier.

In FIG. 13 in which a right side of the driving device 10 is viewed, the arrangement region of the drum portion 29 of the magazine 20, the arrangement region of the electrical motor 15 and the arrangement region of the handle 22 are at least partially overlap one another. Therefore, the center of gravity G1 of the driving device 10 is positioned inside the arrangement region of the handle 22. When the user brings the tip of the push lever 28 to contact with the workpiece W1, tilt of the driving device 10 toward either the right side or the left side in the user's view can be suppressed, and the posture of the driving device 10 can be easily kept.

Reference Example

Figure 14:
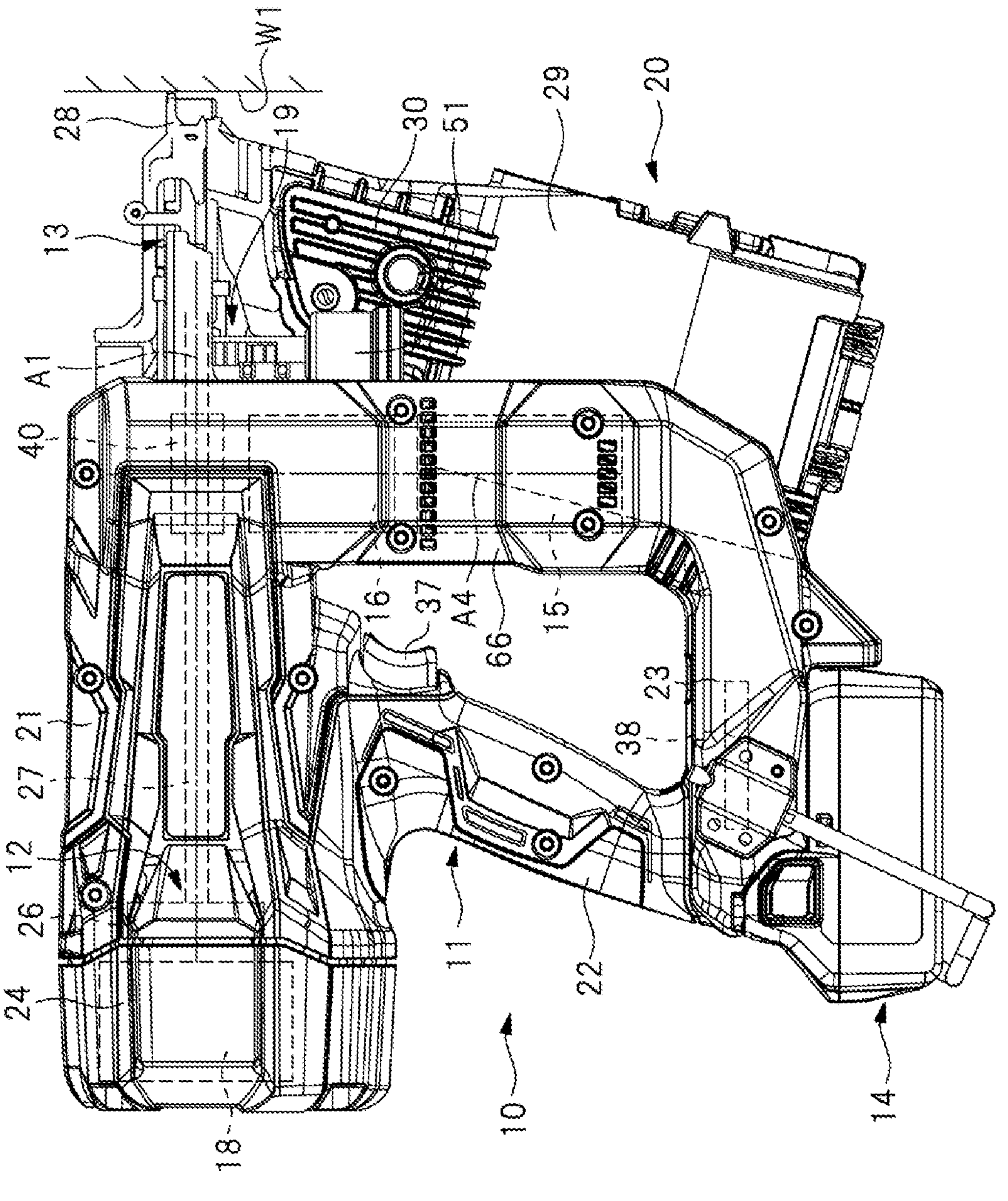
FIG. 14 is a front view showing a reference example of the driving device.
Figure 15:
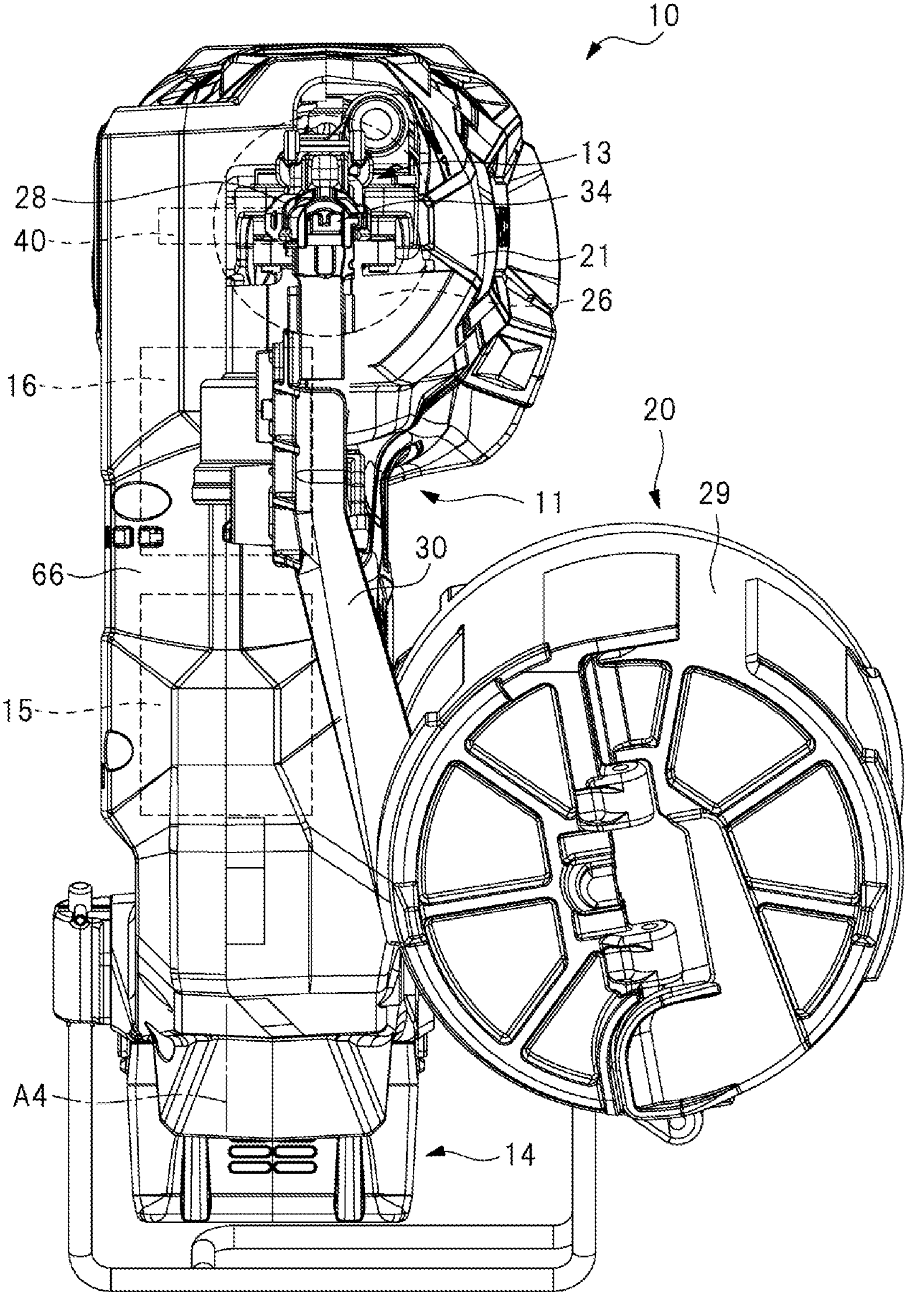
FIG. 15 is a right side view showing the driving device of FIG. 14.

A driving device 10 shown in FIGS. 14 and 15 is a reference example. In FIG. 14 in which a front side of the driving device 10 is viewed, the arrangement region of the drum portion 29 of the magazine 20 and the arrangement region of the electrical motor 15 at least partially overlap each other. In FIG. 14, the center line A1 and the center line A4 cross each other at an angle that is substantially 90 degrees. Further, in FIG. 15 in which a right side of the driving device 10 of FIG. 14 is viewed, the arrangement region of the drum portion 29 of the magazine 20 and the arrangement region of the electrical motor 15 are entirely different from each other. The connecting portion 30 shown in FIG. 15 tilts from the center line A4. Other configurations of the driving device 10 shown in FIGS. 14 and 15 are the same as other configurations of the driving device 10 shown in FIGS. 12 and 13.

Examples of technical meaning of the matters disclosed in some embodiments are as follows: The driving device 10 is one example of the driving device. The striking portion 12 is one example of the striking portion. The nail 31 is one example of the fastener. The magazine 20 is one example of the magazine. The injecting portion 13 is one example of the injecting portion. The first direction B1 is one example of the first direction, and the second direction B2 is one example of the second direction. The pressure room 18 is one example of the pressure room and the first bias portion. Teach of the electrical motors 15 and 64 is one example of the electrical motor. The housing 21 is one example of the housing.

FIGS. 1, 8 and 12 show one example of the first virtual plane. FIGS. 2 and 9 show one example of the second virtual plane. The handle 22 is one example of the handle. The direction along the center line A1 or the direction parallel to the center line A1 is one example of the moving direction of the striking portion. Each of the left and right direction in FIG. 2 and the left and right direction in FIG. 9 is one example of the direction crossing the moving direction of the striking portion. Each of the rotary shafts 35 and 65 is one example of the rotary shaft. Each of the center lines A2 and A3 is one example of the rotary center line.

The electrical motor 15 is one example of the first motor, and the electrical motor 64 is one example of the second motor. The motor case 66 is one example of the motor case. The feeding portion 19 is one example of the feeding mechanism.

The driving device is not limited to the foregoing embodiments, and various modifications can be made within the scope of the present invention. For example, the workpiece to which the fastener is driven in may be any of a wall, a floor, a ceiling, a pillar, a beam and others. In a state in which the push lever is in contact with the workpiece, the moving direction of the striking portion may be the horizontal direction, the vertical direction, or between the horizontal direction and the vertical direction. The driving device includes the one having the injecting portion and the housing that are unified. The driving device includes the one having the injecting portion and the housing that are made of different members and fixed to each other.

The first bias portion is not only the one moving the striking portion by using the pressure of the compressed fluid but also may be a sold spring, a magnetic spring or a synthetic rubber. In the sold spring, the striking portion is moved by, for example, an elastic restoring force of a metallic spring. In the magnetic spring, the striking portion is moved by a magnetic attraction force or repulsive force of a magnet. In the synthetic rubber, the striking portion is moved by, for example, an elastic restoring force.

The electrical motor may be either a brushless motor (inverter motor) or a brushed motor. The housing may be any of the ones made of metal, synthetic resin, or metal coated with synthetic rubber or synthetic resin. The housing is tubular, and includes a casing and a body. The handle may have any of a tubular shape, a rod shape, a shaft shape and others.

The feeding portion may be defined as the feeding mechanism that is movable to feed the fastener to the injecting portion or the moving member that is movable to feed the fastener to the injecting portion. The feeding portion includes the element that is rotatable by the power of the electrical motor, the element that is linearly movable by the power of the electrical motor, and the element that is in contact with the fastener and movable in the direction of feeding the fastener. The element that is rotatable by the power of the electrical motor is, for example, a gear or an arm. The element that is linearly movable by the power of the electrical motor is, for example, a piston or a plunger. The element that is movable in the direction of feeding the fastener is, for example, a feeder, a feed pawl and an engaging member. The feeding portion is configured to be moved by the electrical motor moving the striking portion. However, an actuator may be separately arranged. For example, a dedicated electrical motor having a rotary shaft or a linearly-movable dedicated solenoid are arranged. However, in all the cases, in order to make the timing adjustment easy, the feeding portion is desirably controlled by the control portion that controls the electrical motor moving the striking portion.

The power transmitting portion may include any one or a plurality of transmitting devices that are a gear string that is a meshing-drive device, a pulley and a belt that are a wrapping-drive transmitting device and a friction roller that is a friction-drive device.

The power supply portion that supplies the power to the electrical motor may be either a direct-current power supply or an alternate-current power supply. The direct-current power supply may be either a secondary battery or a primary battery. The alternate-current power supply may not be arranged in the mounting portion, and the mounting portion and the alternate-current power supply may be connected to each other by a power cable. The fastener may be either a nail with a head portion or a nail without the head portion.

The virtual planes and the center lines explained in the embodiments do not physically exist, and are merely imaginary planes and imaginary lines in engineering. The first virtual plane may be not only the front view of the driving device but also a back view of the same. In other words, a plurality of the first virtual planes can be assumed. However, since the virtual planes are in parallel to one another, the relation between the arrangement region of the electrical motor and the arrangement region of the magazine in each virtual plane is the same as one another. Further, the second virtual plane may be not only the planar view of the driving device but also a bottom view of the same. In other words, a plurality of the second virtual planes can be assumed. However, since the virtual planes are in parallel to one another, the relation between the arrangement region of the electrical motor and the arrangement region of the magazine in each virtual plane is the same as one another. The position of the piston at the farthest from the injecting portion in the direction along the center line can be defined as the top dead center of the striking portion. The position of the piston at the closest to the injecting portion in the direction along the center line can be defined as the bottom dead center of the striking portion.

Further, the phrase describing that "the rotary shaft extends in parallel to the moving direction of the striking portion" also includes a case in which the extending direction of the rotary shaft and the moving direction of the striking portion are slightly different from each other due to tolerance in mechanical processing or others, attachment error of components, or others. Still further, the expression of "the cylindrical-shape magazine" describes the outer appearance shape of the magazine, and describes that the magazine is hollow.

Still further, the phrase describing that "the first motor and the second motor are arranged to sandwich the striking portion therebetween" does not mean that the first motor and the second motor are not in contact with the striking portion. There is a space between the striking portion and the first and second motors, and the striking portion is movable. Still further, the striking portion is not in contact with both the first and second motors even when moving.

EXPLANATION OF REFERENCE CHARACTERS

10 . . . driving device, 12 . . . striking portion, 13 . . . injecting portion, 15 and 64 . . . electrical motor, 18 . . . pressure room, 19 . . . feeding portion, 20 . . . magazine, 21 . . . housing, 22 . . . handle, 31 . . . nail, 35 and 65 . . . rotary shaft, 66 . . . motor case, A2 and A3 . . . center line, B1 . . . first direction, B2 . . . second direction

The invention claimed is:

1. A driving device comprising:

a magazine configured to house a plurality of fasteners;

an injecting portion configured to receive one of the fasteners fed from the magazine;

a striking portion configured to be movable in a first direction to strike the one of the fasteners fed to the injecting portion and movable in a second direction that is opposite to the first direction;

a cylinder configured to guide movement of the striking portion;

a pressure chamber configured to be filled with a compressed gas to move the striking portion in the first direction;

an electrical motor;

a wheel coupled with the striking portion and configured to be rotated by the electrical motor to move the striking portion in the second direction;

a housing configured to support the striking portion and the electrical motor; and a handle configured to protrude from the housing in a third direction crossing the first and second directions, wherein the electrical motor has a rotary shaft, wherein the rotary shaft extends in parallel to the first and second directions, and is arranged to be adjacent to the cylinder in a fourth direction crossing the first to third directions, wherein the rotary shaft is arranged between a center axis of the cylinder and the handle in the third direction, wherein a rotary axis of the wheel extends in a fifth direction that is orthogonal to the first and second directions, and wherein the cylinder and the wheel are arranged to overlap in the first and second directions.

2. The driving device according to claim 1, wherein the pressure chamber, the cylinder and the electrical motor are arranged inside the housing.

3. The driving device according to claim 2, wherein the electrical motor includes a first motor and a second motor, and wherein the first motor and the second motor are arranged to sandwich the striking portion therebetween.

4. The driving device according to claim 1 further comprising:

a control portion configured to control the electrical motor; and a feeding portion configured to be movable to feed the one of the fasteners housed in the magazine to the injecting portion, wherein the feeding portion is controlled by the control portion.

5. The driving device according to claim 4, wherein the feeding portion is moved by the electrical motor.

6. The driving device according to claim 1, wherein the electrical motor is a brushless motor.

7. The driving device according to claim 1, wherein an arrangement region of the electrical motor and an arrangement region of the magazine partially overlap each other in a sixth direction crossing the first and second directions inside a second virtual plane crossing a direction of protrusion of the handle from the housing.

8. A driving device comprising:

a cylindrical-shape magazine configured to house a plurality of fasteners connected in a roll form;

an injecting portion configured to receive one of the fasteners fed from the cylindrical-shape magazine;

a striking portion configured to be movable in a first direction in which to strike the one of the fasteners fed to the injecting portion and movable in a second direction that is opposite to the first direction;

a biasing portion configured to move the striking portion in the first direction;

an electrical motor configured to move the striking portion in the second direction;

a housing configured to support the striking portion;

a handle configured to protrude from the housing in a third direction crossing the first and second directions;

a motor case configured to support the electrical motor and protrude from the housing in the third direction; and a mounting portion that extends in a fourth direction parallel to the first and second directions and connects the handle and the motor case together on a side opposite the housing, wherein the cylindrical-shape magazine includes a drum portion which has a cylindrical-shape and houses the plurality of fasteners, and a connecting portion connecting the drum portion to the injection portion, wherein the handle overlaps both the motor case and the cylindrical-shape magazine in the first and second directions, and wherein the drum portion of the cylindrical-shape magazine and the mounting portion overlap in the first and second directions.

9. The driving device according to claim 8, wherein the third direction crosses both (1) the first and second directions and (2) a direction perpendicular to the first and second directions the motor case extends in the third direction.

10. The driving device according to claim 9, wherein the cylindrical-shape magazine extends in the third direction, wherein the motor case has a bottom face facing opposite the handle, and wherein the cylindrical-shape magazine is arranged along the bottom face of the motor case.

11. The driving device according to claim 8 further comprising a wheel coupled with the striking portion and configured to be rotated by the electrical motor to move the striking portion in the second direction, wherein the wheel and the biasing portion are arranged to overlap in the first and second directions.

12. The driving device according to claim 8, further comprising a power supply portion which supplies power to the electrical motor, wherein the mounting portion holds the power supply portion, and wherein the drum portion of the cylindrical-shape magazine, the mounting portion, and the power supply portion overlap in the first and second directions.

13. The driving device according to claim 8 further comprising a control portion disposed inside the mounting portion and configured to control the electrical motor, wherein the drum portion of the cylindrical-shape magazine and the control portion overlap in the first and second directions.

14. The driving device according to claim 8, wherein the drum portion of the cylindrical-shape magazine overlaps at least a part of the motor case and at least a part of the housing in a fifth direction orthogonal to the first and second directions, and wherein the at least part of the motor case is positioned between the drum portion of the magazine and the housing in the fifth direction.

15. The driving device according to claim 8 further comprising a feeding portion configured to feed the fasteners one by one to the injecting portion, wherein the feeding portion and the motor case are arranged to overlap in the first and second directions, and wherein the feeding portion and the drum portion are arranged to overlap in a fifth direction orthogonal to the first and second directions.

16. A driving device comprising:

a cylindrical-shape magazine configured to house a plurality of fasteners connected in a roll form;

an injecting portion configured to receive one of the fasteners fed from the cylindrical-shape magazine;

a striking portion configured to be movable in a first direction to strike the one of the fasteners fed to the injecting portion and movable in a second direction that is opposite to the first direction;

a biasing portion configured to move the striking portion in the first direction;

an electrical motor configured to move the striking portion in the second direction;

a housing configured to support the striking portion;

a handle configured to protrude from the housing in a third direction crossing the first and second directions; and a motor case configured to support the electrical motor and protrude from the housing in the third direction, wherein the cylindrical-shape magazine includes a drum portion which has cylindrical-shape and houses the plurality of fasteners, and a connecting portion connecting the drum portion to the injection portion, wherein the drum portion of the cylindrical-shape magazine overlaps at least a part of the motor case and at least a part of the housing in a fourth direction orthogonal to the first and second directions, and wherein the at least part of the motor case is positioned between the drum portion of the cylindrical-shape magazine and the housing in the fourth direction.

17. The driving device according to claim 16, further comprising a mounting portion that extends in a fifth direction parallel to the first and second directions and connects the handle and the motor case together on a side opposite the housing, wherein the motor case and a part of the drum portion of the cylindrical-shape magazine are arranged to overlap in the fourth direction orthogonal to the first and second directions, and wherein the part of the drum portion is further arranged below the mounting portion in the first and second directions.

18. The driving device according to claim 17, further comprising a power supply portion which supplies power to the electrical motor, wherein the mounting portion holds the power supply portion, and wherein the drum portion of the cylindrical-shape magazine, the mounting portion, and the power supply portion overlap in the first and second directions.

19. The driving device according to claim 16 further comprising a feeding portion configured to feed the fasteners one by one to the injecting portion, wherein the feeding portion and the motor case are arranged to overlap in the first and second directions, and wherein the feeding portion and the drum portion are arranged to overlap in a fifth direction orthogonal to the first and second directions.

20. The driving device according to claim 16 further comprising a wheel coupled with the striking portion and configured to be rotated by the electrical motor to move the striking portion in the second direction, wherein the wheel and the biasing portion overlap in the first and second directions.

* * * * *